US007759585B2

(12) United States Patent
Widmer

(10) Patent No.: US 7,759,585 B2
(45) Date of Patent: Jul. 20, 2010

(54) DISTRIBUTION UNIT WITH PUSHING UNIT AND A WEIGHING APPARATUS INCLUDING SAID DISTRIBUTION UNIT

(75) Inventor: Hans Peter Widmer, Hadsten (DK)

(73) Assignee: Bilwinco A/S, Skanderborg (DK)

( * ) Notice: Subject to any disclaimer, the term of this patent is extended or adjusted under 35 U.S.C. 154(b) by 183 days.

(21) Appl. No.: 11/920,725

(22) PCT Filed: May 24, 2006

(86) PCT No.: PCT/DK2006/000282

§ 371 (c)(1),
(2), (4) Date: Nov. 20, 2007

(87) PCT Pub. No.: WO2006/125439

PCT Pub. Date: Nov. 30, 2006

(65) Prior Publication Data

US 2009/0136325 A1    May 28, 2009

(30) Foreign Application Priority Data

May 25, 2005    (DK)    ............................... 2005 00760

(51) Int. Cl.
*G01G 19/393* (2006.01)
*G01G 19/387* (2006.01)

(52) U.S. Cl. .................... 177/25.18; 198/533; 198/566; 198/601; 198/752.1; 198/771; 222/478; 222/485; 414/301; 406/157; 406/162; 239/681; 239/687; 239/688; 141/132

(58) Field of Classification Search ............. 177/25.18; 222/478, 485; 198/533, 566, 601, 752.1, 198/771; 414/301; 406/157, 162; 239/681, 239/687, 688; 141/132
See application file for complete search history.

(56) References Cited

U.S. PATENT DOCUMENTS

| 4,516,644 | A | * | 5/1985 | Fukuda ..................... 177/25.18 |
| 4,569,405 | A | * | 2/1986 | Oshima .................... 177/25.18 |
| 4,596,327 | A | * | 6/1986 | Yamano ..................... 198/533 |
| 4,609,153 | A | * | 9/1986 | van der Lely ............... 239/665 |
| 4,662,508 | A |   | 5/1987 | Inoue et al. |
| 4,688,654 | A |   | 8/1987 | Mosher et al. |
| 5,813,195 | A | * | 9/1998 | Nielsen et al. ................. 53/443 |
| 6,588,685 | B2 | * | 7/2003 | Woodruff et al. ........... 239/650 |
| 6,689,961 | B2 | * | 2/2004 | Matsuyama et al. ...... 177/25.18 |
| 6,786,435 | B2 | * | 9/2004 | Mishra ....................... 239/677 |

(Continued)

FOREIGN PATENT DOCUMENTS

EP    1 245 936 B1    10/2002

(Continued)

*Primary Examiner*—Randy W Gibson
(74) *Attorney, Agent, or Firm*—Finnegan, Henderson, Farabow, Garrett & Dunner, L.L.P.

(57) ABSTRACT

Distribution unit (21, 23) for distributing material into a number of delimited openings (23) arranged next to each other in such a manner that a transition (27) is provided between the individual openings; and wherein, in connection with the individual transition, a pushing unit (25) is arranged, wherein said pushing unit is arranged such that it is able to actively push material in a direction away from the transition. The distribution unit may partake in a weighing apparatus. Material settling in the transition is pushed down into one of the openings by the pushing unit.

7 Claims, 4 Drawing Sheets

U.S. PATENT DOCUMENTS

| | | | |
|---|---|---|---|
| 7,038,145 B2 * | 5/2006 | Fujii | 177/25.18 |
| 7,301,110 B2 * | 11/2007 | Hansen | 177/25.18 |
| 7,569,778 B2 * | 8/2009 | Hansen | 177/25.18 |
| 2003/0034406 A1 * | 2/2003 | Mishra | 239/681 |
| 2005/0205308 A1 | 9/2005 | Brix | |

FOREIGN PATENT DOCUMENTS

| | | |
|---|---|---|
| JP | 02-35318 | 2/1990 |
| WO | WO 03/087736 A1 | 10/2003 |

* cited by examiner

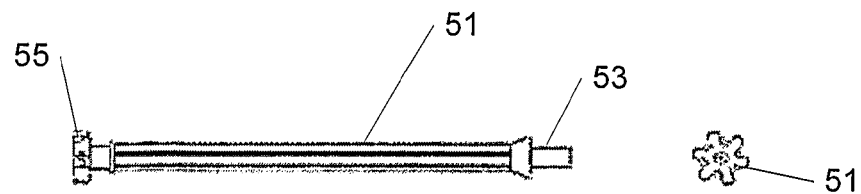
Fig. 5a  Fig. 5b
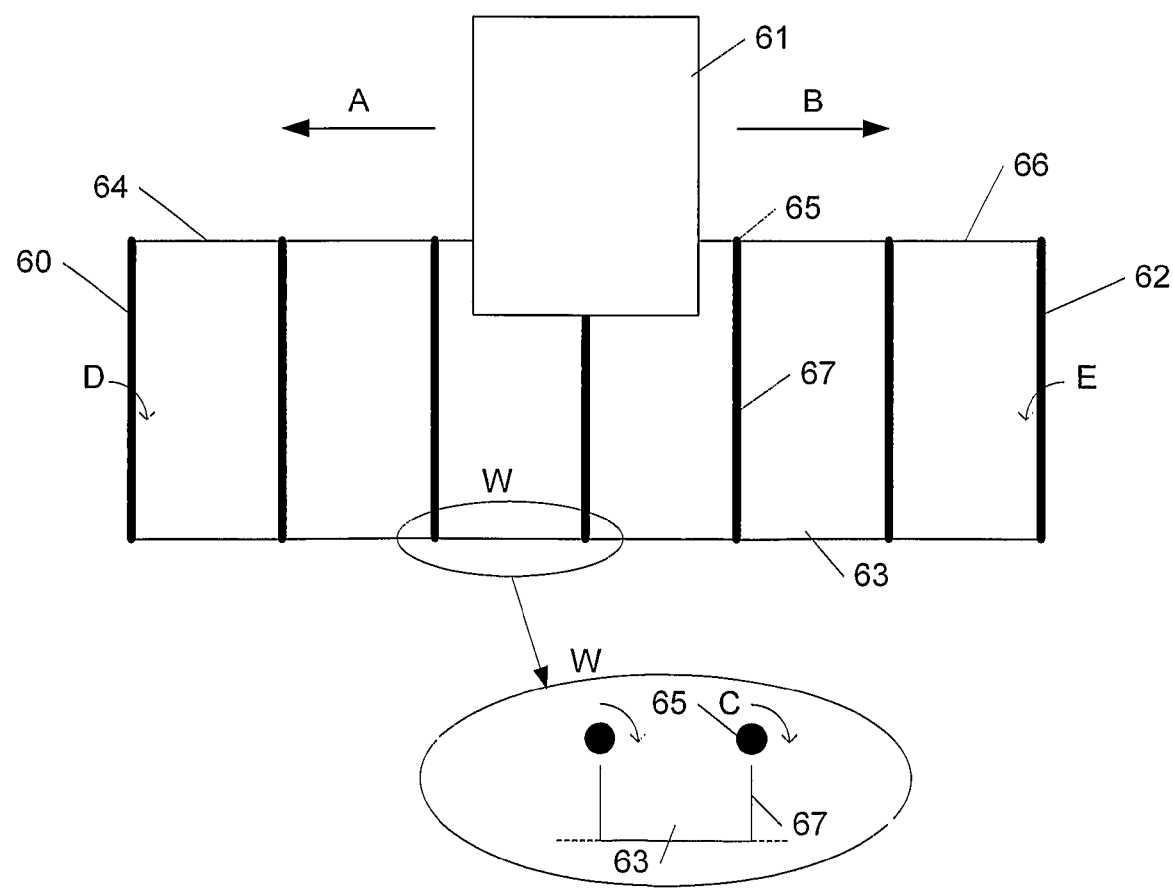
Fig. 6

DISTRIBUTION UNIT WITH PUSHING UNIT AND A WEIGHING APPARATUS INCLUDING SAID DISTRIBUTION UNIT

The present invention relates to a distribution unit for distributing material in a number of delimited openings arranged next to each other in such a manner that a transition is provided between the individual openings. Also, the invention relates to a weighing apparatus for portioning material, wherein the weighing apparatus comprises a distribution unit for distribution of material into a number of delimited openings arranged next to each other in such a manner that a transition is provided between the individual openings. Moreover the invention relates to a method of distributing material between a number of delimited openings arranged next to each other in such a manner that a transition is provided between the individual openings.

Weighing apparatuses can be used to form portions of bulk material which have a weight that is very close to a desired reference weight, whereby the portions can be transferred to eg a packaging apparatus that packs the individual portions. This kind of weighing apparatuses which is often designated combination weights function in that, by means of the conveyors, each of the weighing scales is filled with a batch of the bulk material which was initially supplied to a distribution unit comprising a central distributor and a number of linear conveyors, wherein the distribution unit functions in that, via the central distributor, it distributes bulk material to the individual linear conveyors. Then the individual batch of the bulk material is weighed in the individual weighing scales, and the scales that combine to contain the bulk material close to the desired reference weight are identified. Finally, the scales thus found are activated for discharge for forming the total portion of the bulk material. Since it is possible to continuously form and identify combinations of scales that combine to contain the desired weight, such apparatuses achieve very high production rates by forming many portions of material with very small variations in weight.

A problem arises in distribution unit of the known apparatuses when bulk material is transferred to the linear conveyors via the central distributor. The individual linear conveyors are configured as a number of delimited openings arranged next to each other in such a manner that a transition is provided between the individual openings. The problem arises when bulk material deposits on the transition as such between the openings in the linear conveyors, and thereby the material is not advanced to the scales.

This problem means that one has to monitor the distribution and continuously remove material from the transition both to ensure that all of the material is used in the subsequent weighing procedure and to ensure that material does not accumulate and hence entails that the weighing apparatus no longer works as intended.

From an entirely general point of view, corresponding problems may occur in other distribution units where material is to be distributed among a number of delimited openings arranged next to each other in such a manner that a transition occurs. If material is to be distributed among these openings, the material may deposit on the transition as such.

Based on this, it is the object of the present invention to provide a weighing apparatus of the kind described in the introductory part, by which they are completely or partially remedied.

This is accomplished in accordance with the invention with a distribution unit for distributing material in a number of delimited openings arranged next to each other in such a manner that a transition is provided between the individual openings; and wherein, in connection with the individual transition, a pushing unit is arranged, where said pushing unit is arranged to actively push material in a direction away from the transition.

Thereby material depositing on the transition will be pushed down into one of the openings, and thereby it is ensured that material does not deposit on the transition, and that all material ends up in the delimited openings. Exemplary pushing units include rotating units that extend along the transition. The unit may also vibrate eg by alternatingly rotating one quarter of a round to each side. In case of several transitions, some units may rotate in one direction and others rotate in another direction. According to one embodiment, the unit may have brushes. As used in the application, the term 'push' is to be construed as any kind of transport enabling movement of the material away from the transition, including pulling, pushing, moving; and a pushing unit may in this context be a transport unit which pulls, pushes, moves the material away from the transition and down into the delimited openings.

According to one embodiment the pushing unit is configured as a cylinder extending in a direction which is preferably in parallel with the transition between said openings, wherein said cylinder is capable of rotating and hence of actively pushing material in a direction from the transition and down into the delimited openings.

This is an advantageous embodiment, since it is hereby possible to accomplish, in a simple manner, a pushing unit that pushes away material, irrespective of where on the expanse of the transition the material deposits.

According to one embodiment the rotating cylinder has a surface that yields good friction between the material to be distributed and the cylinder.

Such surface can be accomplished either by imparting a pattern to the surface or by allowing at least the surface to be configured in a material, where—based on the surface pattern and/or the material—a friction is accomplished between the material and the surface, whereby the surface pushes the material down into the opening rather than merely slides across the material. Properties of the cylinder that entail good friction relative to the material thus depend on which type of material is to be distributed; in particular the surface of the material. According to one embodiment the unit may have brushes that create the friction between the material and the unit.

According to one embodiment the rotating cylinder has a stellate cross-section. This yields good friction in accordance with the above, and it is thus a positive feature when material is to be pushed down into the openings.

According to one embodiment the distance between the pushing unit and the transition is adjustable. Such adjustability entails that, depending on the material thickness, one is capable of adjusting the difference in order to thereby minimise or eliminate the risk of material depositing between the transition and the pushing unit.

The invention further comprises a weighing apparatus for portioning material, wherein the weighing apparatus comprises a distribution unit for distributing material in a number of delimited openings arranged next to each other in such a manner that a transition is provided between the individual openings, where the distribution unit in the weighing apparatus is a distribution unit as described above.

Moreover the invention relates to a method of distributing material between a number of delimited openings arranged next to each other in such a manner that a transition is provided between the individual openings. The method comprises that a pushing unit pushes the material depositing on the transition during the distribution down into one of said openings.

The invention is described in further detail in the following with reference to the drawing, wherein:

FIGS. 5a and 5b show an embodiment of a pushing unit according to the invention, in transversal and longitudinal views, respectively;

FIG. 6 shows an alternative embodiment of a distribution unit according to the invention, where material is distributed linearly.

Figure 1:
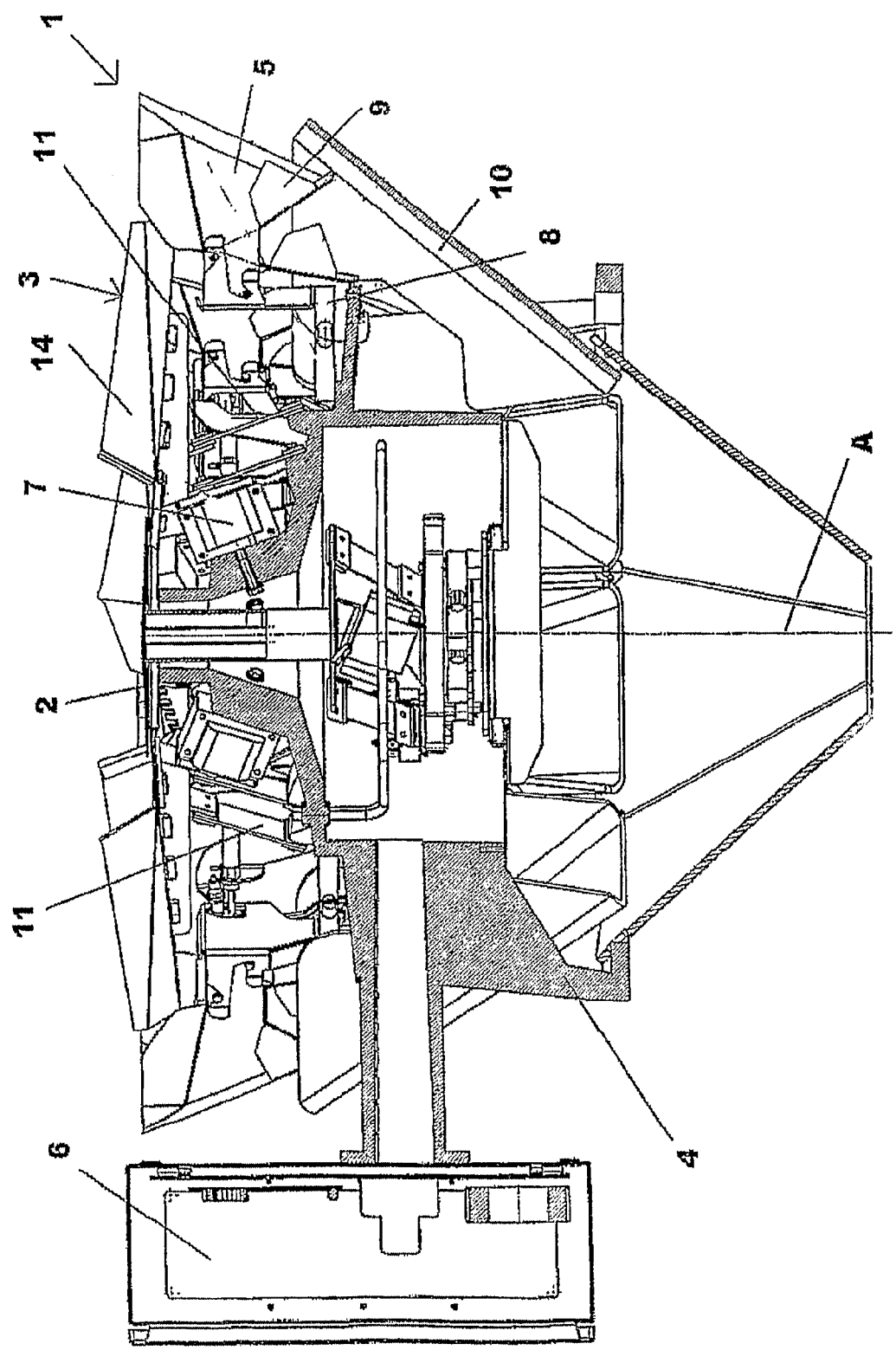
FIG. 1 is a sketch outlining, in a sectional plane through the centre axis of the apparatus, a weighing apparatus without distribution unit according to the invention, seen in a lateral view.

FIG. 1 illustrates a weighing apparatus 1, which weighing apparatus 1, like commonly known weighing apparatuses for combinatory weighing of material, comprises a central distributor 2, a number of conveyors 3 provided with grooves 14, and a number of scales 5. As is commonly known in the context of combinatorial weighing apparatuses of this kind, a fully mounted weighing apparatus comprises a plurality of these linear conveyors 3 and scales 5, arranged peripherally in a circle around the central distributor 2. Thus, the apparatus 1 is constructed essentially symmetrically about its central axis A, and it comprises, as shown, a frame structure 4, herein enhanced by hatching, on which conveyors 3 and scales 5 are mounted; said apparatus being additionally provided with a control cabinet 6 on the frame structure 4 of the apparatus, thereby considerably increasing the overall weight of the frame structure 4.

The functioning of the weighing apparatus 1 is such that, on the central distributor 2, an amount is distributed of the bulk material desired to be portioned. It may be eg utensils, such as nails, screws, bolts, etc., or it may be foodstuff items, such as boiled sweets, winegums, fish or cheese.

By means of the central distributor 2, the bulk material is distributed to the individual conveyors 3. This may happen in that the bulk material slides on the central distributor, but often particular means are used to ensure this distribution, such as a vibrator as shown in the drawing, and configured for imparting to the central distributor a helical movement about the central axis A of the weighing apparatus.

When the bulk material from the central distributor 2 reaches each of the conveyors, they will, eg by means of a linear vibration motor 7—here in the form of an electric coil, which is, according to a preferred embodiment mounted directly on the frame structure 4 of the apparatus and to which an alternating current is applied which thereby generates a varying magnetic field before the coil 7—that causes the linear conveyor 3 to vibrate in a vibration pattern that ensures that the bulk material is moved outwards towards the peripherally arranged scales 5 which are thereby filled at least partially with a portion of the bulk material. Each of the scales 5 being provided with a weighing cell 8 for weighing off the transferred portion, the individual portions can thereby be weighed, and an activatable flap 9 being arranged at the bottom of the scale 5, the weighed off portion can be discharged into the collecting funnel 10 of the weighing apparatus.

Since there are several such linear conveyors 3 and scales 5, it is thus clear that the above function with expedient control, such as computer control, configured in the shown control cabinet 6, is able to perform repeated weighings and discharges of individual portions of the bulk material, and by combining two or more of the portions it is possible to form portions with very small variations compared to a desired weight.

One problem of such weighing apparatus arises when, via the central distributor, bulk material is transferred to the linear conveyors. The individual linear conveyors 3 are configured as a number of delimited openings arranged next to each other in such a manner that a transition is provided between the individual openings. The problem is that bulk material can deposit on the transition as such between the openings in the linear conveyors and thereby the material is not advanced to the scales.

Figure 2:
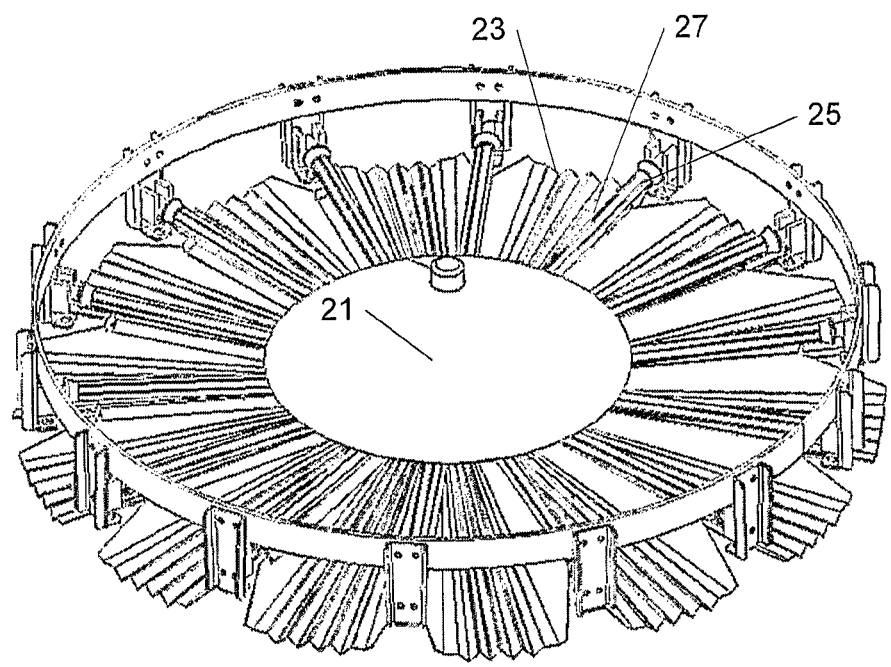
FIG. 2 shows a distribution unit according to the invention from a corresponding weighing apparatus.

FIG. 2 shows a distribution unit according to the invention from a corresponding weighing apparatus. Here the central distributor 21 is configured conically and is arranged above the conveyors 23 that are arranged circularly next to each other whereby a transition 27 is present between the individual openings. Above the transition 27 between the conveyors 23, a pushing unit 25 is arranged. The distribution unit as such functions by material being arranged on the central distributor 21, which slides on towards the individual conveyors 23. The pushing units 25 rotate, and hence it is avoided that material settles on the transition as such between the conveyors 23.

Figure 3:
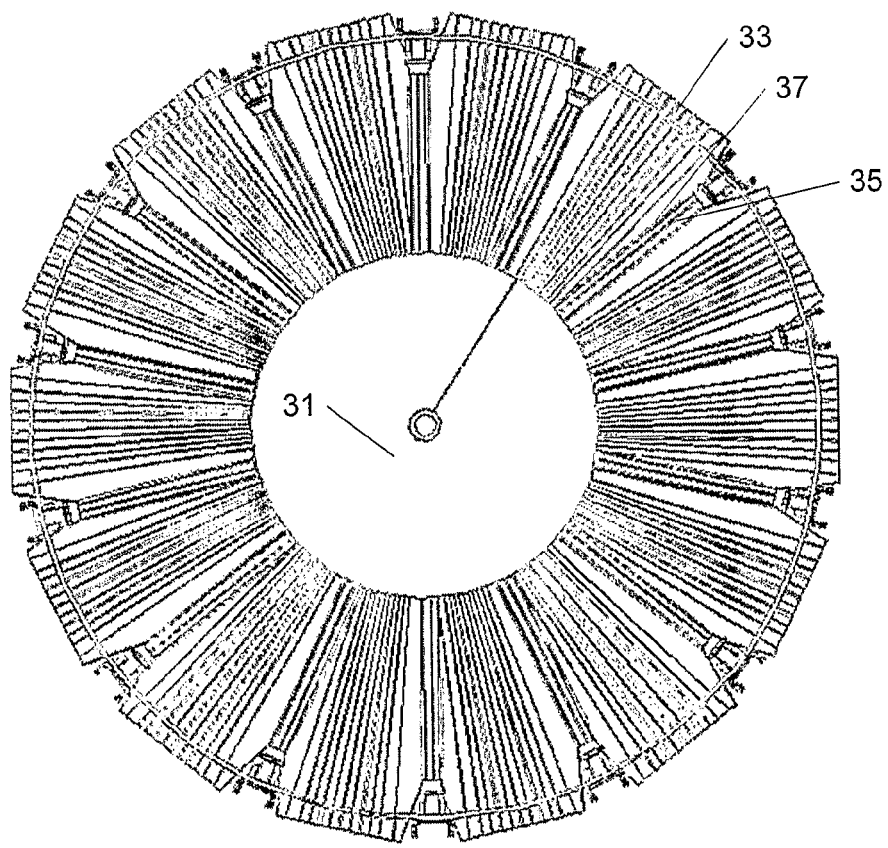
FIG. 3 shows a distribution unit according to the invention, seen from above.

FIG. 3 shows a corresponding distribution unit according to the invention seen from above. Again, the distributor 31 is shown, surrounded by the conveyors 33 arranged circularly next to each other, whereby a transition 37 is present between the individual openings. On top of each transition 37, between the openings in the conveyors 33, a pushing unit 35 is arranged that extends in a direction in parallel with the transition 37.

Figure 4:
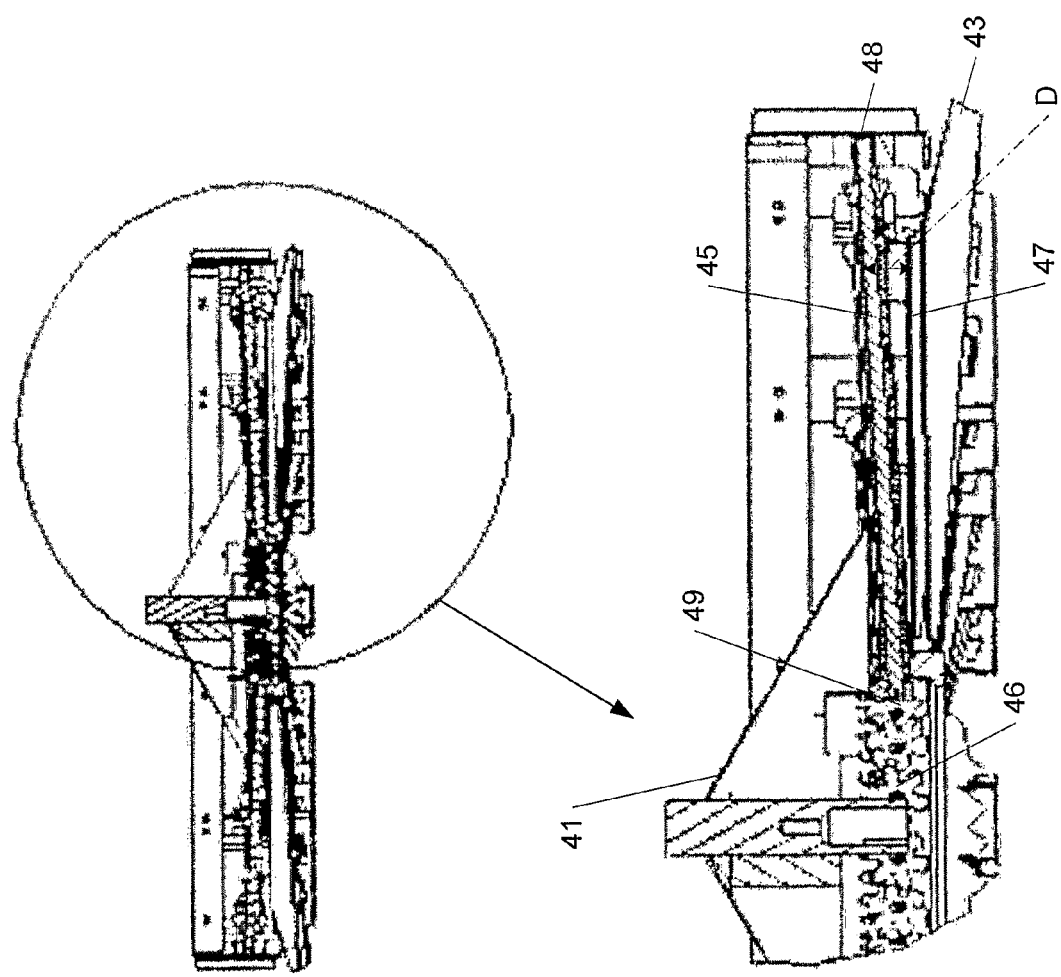
FIG. 4 is a sectional view through the central axis of the distribution unit from a weighing apparatus with a distribution unit according to the invention, showing an area with a pushing unit.

FIG. 4 is a sectional plane view through the central axis of the distribution unit from a weighing apparatus with a distribution unit according to the invention, where an area with a pushing unit is shown. The Figure shows the central distribution unit 41, around which the conveyors are arranged circularly next to each other. At the one end 48 the pushing unit 45 is mounted in a bearing enabling the pushing unit 45 to rotate, and at the other end 49 the pushing unit is rotate via gear wheels 46 that are connected to a drive unit (not shown). According to one embodiment the direction of orientation is changed periodically. Alternatively the direction of rotation is constant. The distance D between the pushing unit 45 and the transition 47 is selected such that the material to be distributed is unable to become stuck between the pushing unit 45 and the transition 47. Such distance may eg be accomplished by providing a distance which is smaller than the thickness of the material, whereby the material is unable to enter between pushing unit 45 and transition 47. According to one embodiment the distance D can be adjusted such that the distance D is set in response to the material dimensions.

FIGS. 5a and 5b show an embodiment of a pushing unit according to the invention, transversally and longitudinally, respectively. The pushing unit has a stellate cross-section; and at the one end 53 the pushing unit is prepared for being mounted in a bearing, wherein the pushing unit at the other end 55 has teeth that enable the pushing unit to rotate upon contact with a rotating gear wheel.

FIG. 6 shows an explanatory sketch of an alternative embodiment of a distribution unit according to the invention, where material is distributed linearly. Herein a central distribution unit 61 is shown which is to receive material to be distributed among a number of conveyors 63, and wherein the material is distributed between the individual conveyors by having the central distribution unit 61 drive back and forth from side to side (illustrated by arrows A and B). To prevent material from depositing on the transitions 67 between the individual conveyors, a pushing unit 65 is provided to push the material down into openings in the conveyors 63. In the section W, the openings in the conveyors 63 and the pushing units 65 are shown and they rotate (illustrated by arrow C) to the effect that the material is pushed away from the transition 67 and down into the opening. To minimise the amount of material dropping beyond the outermost conveyors 64 and 66, the pushing units 60 and 62 may rotate in a direction inwards towards the outer conveyors 64 and 66.

The invention claimed is:

1. A distribution unit for distributing material into a number of delimited openings arranged next to each other in such a manner that a transition is provided between the individual openings, characterised in that the individual transitions have associated with them, a corresponding pushing unit arranged between the individual openings such that it is able to actively push material in a direction away from the transition.

2. A distribution unit according to claim 1, wherein the pushing unit is configured as a cylinder extending in a direction preferably in parallel with the transition between said openings, wherein said cylinder upon rotation actively pushes material in a direction from the transition down into one of said openings.

3. A distribution unit according to claim 2, wherein the rotating cylinder has a surface that provides good friction between the material to be distributed and the cylinder.

4. A distribution unit according to claim 2, wherein the rotating cylinder has a stellate cross-section.

5. A distribution unit according to claim 1, wherein the distance between the pushing unit and the transition is adjustable.

6. A weighing apparatus for portioning material, wherein the weighing apparatus comprises a distribution unit for distributing material into a number of delimited openings arranged next to each other in such a manner that a transition is provided between the individual openings, characterised in that the distribution unit is a distribution unit according to claim 1.

7. A method of distributing material between a number of delimited openings arranged next to each other, whereby a transition is provided between the individual openings, characterised in that a pushing unit arranged in association with a corresponding transition actively pushes material settling on the transition during the distribution down into one of said openings.

* * * * *